United States Patent
Iio et al.

(10) Patent No.: US 9,466,892 B2
(45) Date of Patent: Oct. 11, 2016

(54) TERMINAL FITTING

(71) Applicant: Yazaki Corporation, Minato-ku, Tokyo (JP)

(72) Inventors: Hikaru Iio, Kakegawa (JP); Norio Sugiyama, Kakegawa (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 14/428,304

(22) PCT Filed: Sep. 5, 2013

(86) PCT No.: PCT/JP2013/073974
§ 371 (c)(1),
(2) Date: Mar. 13, 2015

(87) PCT Pub. No.: WO2014/042075
PCT Pub. Date: Mar. 20, 2014

(65) Prior Publication Data
US 2015/0249294 A1    Sep. 3, 2015

(30) Foreign Application Priority Data

Sep. 14, 2012 (JP) ................................ 2012-202924

(51) Int. Cl.
| | | |
|---|---|---|
| H01R 4/02 | (2006.01) | |
| H01R 11/12 | (2006.01) | |
| H01R 43/02 | (2006.01) | |
| B23K 20/10 | (2006.01) | |

(52) U.S. Cl.
CPC .............. *H01R 4/023* (2013.01); *B23K 20/10* (2013.01); *H01R 11/12* (2013.01); *H01R 43/0207* (2013.01); *H01R 2201/26* (2013.01)

(58) Field of Classification Search
USPC ......................... 439/874, 860, 883, 884, 879
See application file for complete search history.

(56) References Cited

U.S. PATENT DOCUMENTS

| | | | | |
|---|---|---|---|---|
| 1,213,632 A | * | 1/1917 | Hammond | .................... 439/860 |
| 1,697,954 A | * | 1/1929 | Gribbie | ........................ 439/883 |

(Continued)

FOREIGN PATENT DOCUMENTS

| | | |
|---|---|---|
| JP | H02-120711 U | 9/1990 |
| JP | 2003-297447 A | 10/2003 |

(Continued)

OTHER PUBLICATIONS

Mar. 17, 2015—International Preliminary Report on Patentability—Intl App PCT/JP2013/073974.
Dec. 3, 2013—International Search Report—Intl App PCT/JP2013/073974.

*Primary Examiner* — Alexander Gilman
(74) *Attorney, Agent, or Firm* — Banner & Witcoff, Ltd.

(57) ABSTRACT

A terminal fitting (17) includes a welded part (26) to which the conductor part of an electric wire is ultrasonically welded, and a board-like mounting part (23) which is formed integrally with the welded part in the axial direction and which a through hole (21) penetrates in the thickness direction. A contour, when viewed from the penetration direction, of the through hole (21) is formed of a large radius circle (31), a small radius circle (33) whose radius is smaller than that of the large radius circle, and two tangent lines (35, 37) which respectively connect the two circles, and the small radius circle is located closer to the welded part than the large radius circle.

2 Claims, 6 Drawing Sheets

(56) References Cited

U.S. PATENT DOCUMENTS

| | | | | |
|---|---|---|---|---|
| 1,921,823 | A * | 8/1933 | Hosking | 439/883 |
| 4,273,401 | A * | 6/1981 | Katzin | 439/286 |
| 4,795,380 | A * | 1/1989 | Frantz | 439/860 |
| 7,033,233 | B2 | 4/2006 | Fujimoto et al. | |
| 8,253,020 | B2 | 8/2012 | Niwa et al. | |
| 8,911,270 | B2 * | 12/2014 | Ambrosy et al. | 439/887 |
| 2003/0226823 | A1 | 12/2003 | Fujimoto et al. | |
| 2008/0194126 | A1 * | 8/2008 | Grant et al. | 439/108 |
| 2009/0255704 | A1 * | 10/2009 | Niwa et al. | 174/68.2 |
| 2011/0130054 | A1 * | 6/2011 | Lamoureux et al. | 439/889 |
| 2014/0065895 | A1 * | 3/2014 | Tomita et al. | 439/884 |

FOREIGN PATENT DOCUMENTS

| | | |
|---|---|---|
| JP | 2003-338328 A | 11/2003 |
| JP | 2006-286385 A | 10/2006 |
| WO | 2008-093544 A1 | 8/2008 |

\* cited by examiner

TERMINAL FITTING

TECHNICAL FIELD

The present invention relates to a terminal fitting, and particularly to a terminal fitting to which the conductor part of an electric wire is ultrasonically welded.

BACKGROUND ART

Various electronic devices are loaded into a moving object such as an automobile, in which a wire harness is wired to supply electric power from a power supply such as a battery to these electronic devices or transmit control signals from a control unit. The wire harness includes a plurality of electric wires and terminal fittings which are attached to terminals of the electric wires.

Each of such kind of electric wires includes a core wire which is formed by twisting a plurality of conductive strands, and an insulative coating which coats the core wire. The core wire, which is exposed by removing the coating at a terminal of the electric wire, is welded to the terminal fitting. The core wire and the terminal fitting are ultrasonically welded.

As shown in FIG. 6, a terminal fitting 50 includes a welded part 55, to which an exposed core wire 53 is welded, and a mounting part 59 which is provided with a circular through hole 57 through which an electronic device or the like is electrically connected. When ultrasonic welding is performed, the exposed core wire 53 is placed between a pair of side walls 61 which the welded part 55 of the terminal fitting 50 is provided with, and a horn 63 is inserted between the pair of side walls 61 from above the exposed core wire 53. By applying ultrasonic vibration to the core wire 53 while the horn 63 is pressed against the core wire 53, the core wire 53 is ultrasonically welded to the welded part 55 (for example, refer to PTL 1.).

CITATION LIST

Patent Literature

PTL 1: JP-A-2003-338328

SUMMARY OF THE INVENTION

Technical Problem

When the horn ultrasonically vibrates in this way, vibration energy of the horn spreads from the welded part, and the mounting part may resonate. Then, stress by the vibration is concentrated on a predetermined position of the mounting part, and a crack or a break may occur in the mounting part when the stress exceeds the breaking point of the material. When the vibration spreads in the mounting part, stress by the resonance may often concentrate on a point where the change in cross section area in a direction perpendicular to the direction in which the vibration spreads is remarkable, for example, a site, near the welded part, of the periphery of the through hole (A part of FIG. 6).

The object of the invention is to prevent a crack or a break of a mounting part when the conductor part of an electric wire is ultrasonically welded to a terminal fitting.

Solution to Problems

In order to solve the above problem, a terminal fitting of the present invention is a terminal fitting to which a conductor part of an electric wire, which is formed by insulatively coating a plurality of core wires, is electrically connected by ultrasonically welding. The terminal fitting includes welded part to which the conductor part of the electric wire is ultrasonically welded, and a board-like mounting part which is formed integrally with the welded part in an axial direction and which a through hole penetrates in a thickness direction. A contour, when viewed from the penetration direction, of the through hole is formed of a large radius circle, a small radius circle whose radius is smaller than that of the large radius circle, and two tangent lines, which respectively connect the two circles, and the small radius circle is located closer to the welded part than the large radius circle.

By forming an contour of the small radius circle whose radius of curvature is smaller than that of the large radius circle at the site, close to the welded part, of the through hole in this way, the cross section area of the mounting part in a direction perpendicular to the axial direction can be prevented from suddenly decreasing along the direction in which vibration spreads. Thereby, a crack or a break of the mounting part can be prevented because the concentration of stress by resonance on the part, near the welded part, of the periphery of the through hole can be alleviated.

Also, in order to solve the above problem, a terminal fitting of the present invention is a terminal fitting to which a conductor part of an electric wire, which is formed by insulatively coating a plurality of core wires, is electrically connected by being ultrasonically welded. The terminal fitting includes a welded part to which the conductor part of the electric wire is ultrasonically welded, and a board-like mounting part which is formed integrally with the welded part in an axial direction and which a through hole penetrates in a thickness direction. The mounting part has a straight part whose two side surfaces in a widthwise direction perpendicular to the axial direction are formed parallel to each other, a contour, when viewed from the penetration direction, of the through hole is formed of a large radius circle, a first small radius circle and a second small radius circle whose radiuses are smaller than that of the large radius circle, two tangent lines, which respectively connect the first small radius circle and the large radius circle, and two tangent lines which respectively connect the second small radius circle and the large radius circle, the first small radius circle is located closer to the welded part than the large radius circle, the second small radius circle is located farther from the welded part than the large radius circle, and the large diameter circle and the first small radius circle are formed in an area of the straight part in the axial direction.

By forming an contour of the second small radius circle whose radius of curvature is smaller than that of the large radius circle at the site, far from the welded part, of the through hole in this way, the cross section area of the mounting part in a direction perpendicular to the axial direction can be prevented from suddenly increasing along the direction in which vibration spreads. Thereby, a crack or a break of the mounting part can be prevented in a wider range because the concentration of stress by resonance on the part, far from the welded part, of the periphery of the through hole, besides the part, near the welded part, of the periphery of the through hole, can be alleviated.

The present invention has been briefly described above. Further, details of the present invention will become more apparent after embodiments of the invention described below (hereinafter referred to as "embodiments") are read with reference to the accompanying figures.

BRIEF DESCRIPTION OF DRAWINGS

FIGS. 4A to 4C are figures which describes change of the cross section area of a mounting part of the terminal fitting according to the embodiment of the present invention, in which FIG. 4A is a top view of the embodiment, FIG. 4B is a schematic view which illustrates the shape of the through hole of the embodiment as a change of the cross section area of the mounting part in a direction perpendicular to the central axis X, and FIG. 4C is a schematic view which illustrates the shape of the traditional through hole shown in FIG. 6 as a change of the cross section area of the mounting part in a direction perpendicular to the central axis X.

FIGS. 5A to 5B are figures which describes change of the cross section area of a mounting part of the terminal fitting according to another embodiment of the present invention, in which FIG. 5A is a top view of the embodiment, and FIG. 5B is a schematic view which illustrates the shape of a through hole of the embodiment as a change of the cross section area of the mounting part in a direction perpendicular to the central axis X.

DESCRIPTION OF EMBODIMENTS

Next, a terminal fitting according to one embodiment of the present invention is described with reference to the figures. In the present embodiment, ultrasonic welding is performed on the terminal fitting according to the present invention by using a well-known ultrasonic welding device. Therefore, in the present embodiment, the constitution and operation of the terminal fitting is described mainly, and the constitution of the ultrasonic welding device is briefly described. In the present embodiment, an example of using a wire harness, which is loaded in an automobile as an electric wire which is connected to the terminal fitting, is described, but the kind of the electric wire is not limited to this example.

Figure 1:
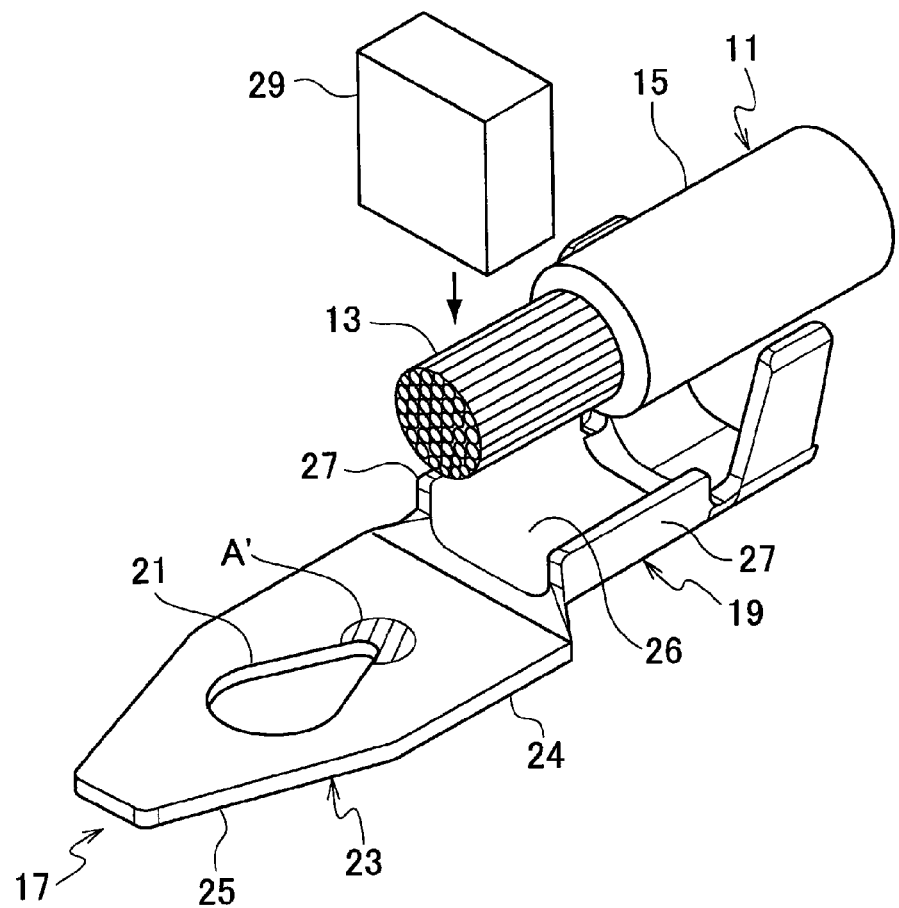
FIG. 1 is an appearance perspective view of a terminal fitting according to one embodiment of the present invention before the terminal fitting is ultrasonically welded.

As shown in FIG. 1, an electric wire 11 includes a core wire 13 (conductor part) which includes a plurality of conductive strands and an insulative coating 15. The core wire 13 is formed of conductive metal such as copper or copper alloy. The coating 15 is formed of insulative synthetic resin or the like, and coats the core wire 13.

A terminal fitting 17 is formed by bending a metal board which is punched into a predetermined shape. The terminal fitting 17 is formed by connecting in the axial direction (longitudinal direction) a core wire connecting part 19 to which the exposed core wire 13 is welded, and a board-like mounting part 23 which is formed with a through hole 21 in the thickness direction and to which an electronic device or the like is electrically connected. The mounting part 23 has a straight part 24 which has two side surfaces in the widthwise direction that are formed parallel to each other, and a tapered part 25 which has two side surfaces in the widthwise direction the distance between which gradually gets smaller towards the distal end. The core wire connecting part 19 includes a welded part 26 on which the core wire 13 is put, and a pair of side walls 27 which raise from the two ends of the welded part 26 in the widthwise direction.

Figure 2:
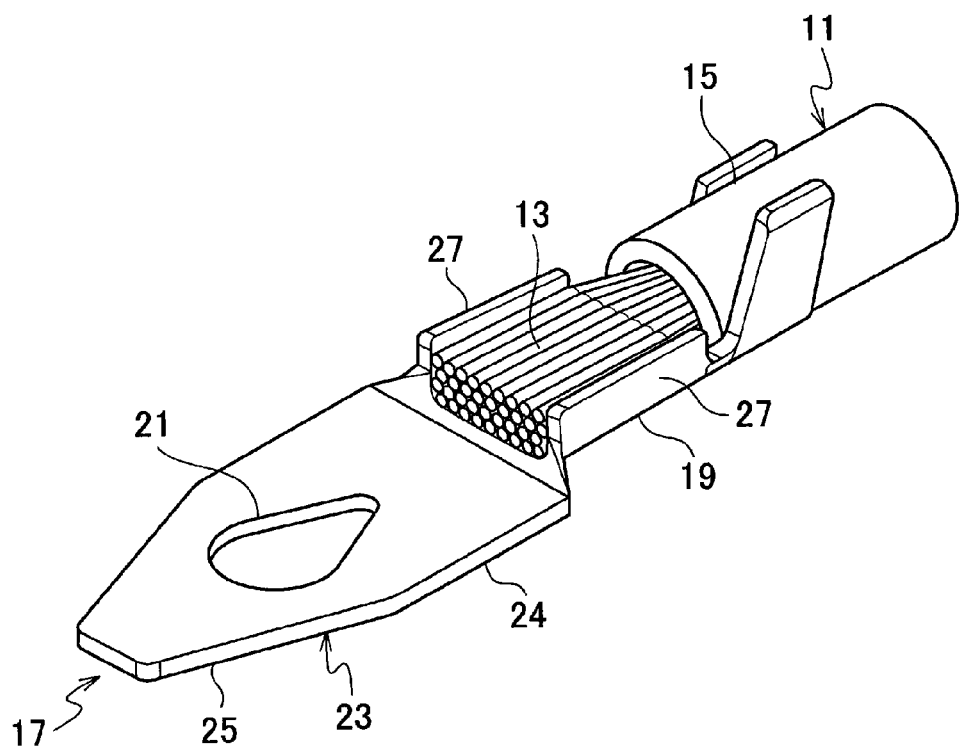
FIG. 2 is an appearance perspective view of the terminal fitting according to the embodiment of the present invention after the terminal fitting is ultrasonically welded.

The ultrasonic welding device includes a horn 29 and a jig (not shown) which supports the terminal fitting 17. While the terminal fitting 17 is set on the jig, and the core wire 13 of the electric wire 11 is put on the welded part 26 of the terminal fitting 17, the ultrasonic welding device presses the core wire 13 against the terminal fitting 17 and applies ultrasonic energy to the core wire 13. Specifically, as shown in FIG. 1, while the core wire 13 is placed between the pair of side walls 27, the horn 29 is moved in the arrow direction (downward in FIG. 1), and the core wire 13 is pressed against the welded part 26 while being ultrasonically vibrated. Then, since the core wire 13 generates heat by vibration and melts, as shown in FIG. 2, the core wire 13 is welded to the core wire connecting part 19 as a unit.

When the horn 29 ultrasonically vibrates in this way, vibration energy of the horn 29 spreads from the core wire connecting part 19 (the welded part 26) to the mounting part 23, and the mounting part 23 may resonate. Particularly, when the vibration spreads to the mounting part 23, stress by the resonance is easy to concentrate on a point (for example, a site, near the core wire connecting part 19, of the periphery of the through hole 21) where the change in cross section area in a direction perpendicular to the direction the vibration spreads is remarkable, a crack or a break may occur in the mounting part 23 when the stress exceeds the breaking point of the material.

Then, the feature constitution of the mounting part 23 of the terminal fitting 17 is described.

Figure 3:
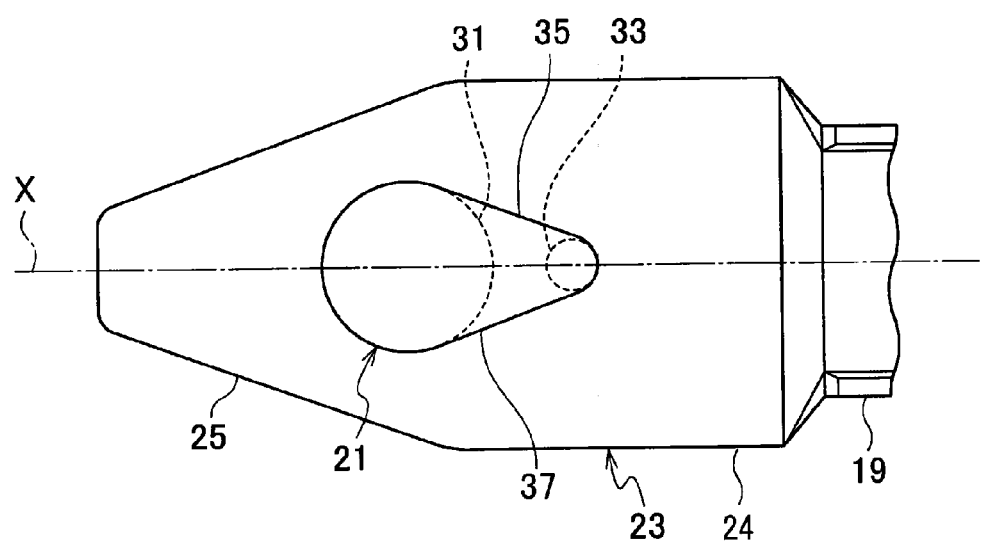
FIG. 3 is a top view which shows that a through hole of the terminal fitting according to the embodiment of the present invention is enlarged.

The terminal fitting 17 is provided with the through hole 21 through which a fastener (not shown) such as a bolt or a nut of a circular cross section passes. As shown in FIG. 3, the through hole 21 is formed to have a teardrop-like contour when viewed from the penetration direction. For example, the through hole 21 is formed by uniting a large radius circle 31 and a small radius circle 33 whose radiuses are different from each other, and two tangent lines 35, 37 which respectively connect the circles. The small radius circle 33 means a circle which has a radius R2 that is smaller than a radius R1 of the large radius circle 31. The centers of the large radius circle 31 and the small radius circle 33 are all placed on the longitudinal central axis X of the mounting part 23. The small radius circle 33 is placed to be closer to the core wire connecting part 19 than the large radius circle 31.

In the present embodiment, the small radius circle 33 of the through hole 21 shall be formed in an area of the straight part 24 in the axial direction. The radius R1 of the large radius circle 31 is set to, for example, the same size as the radius of the through hole 57 of FIG. 6 to match the size of the fastener.

Figure 4A:
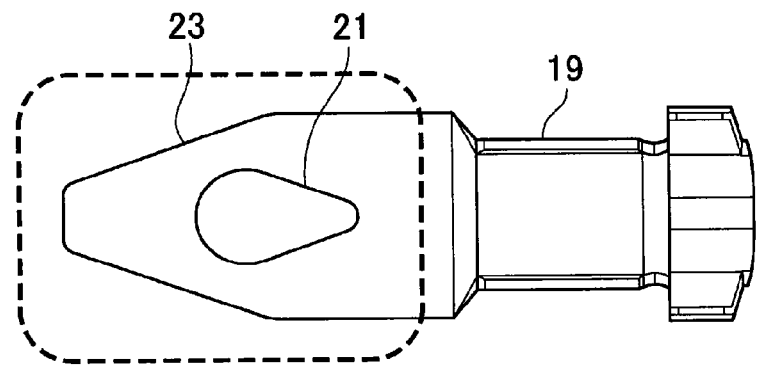
Figure 4B:
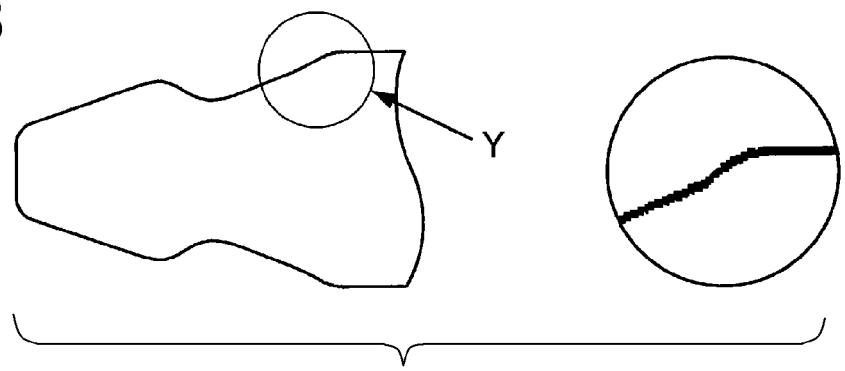
Figure 4C:
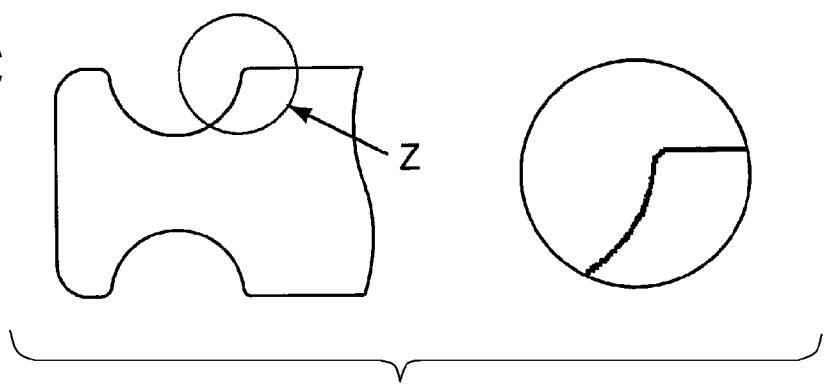
Figure 6:
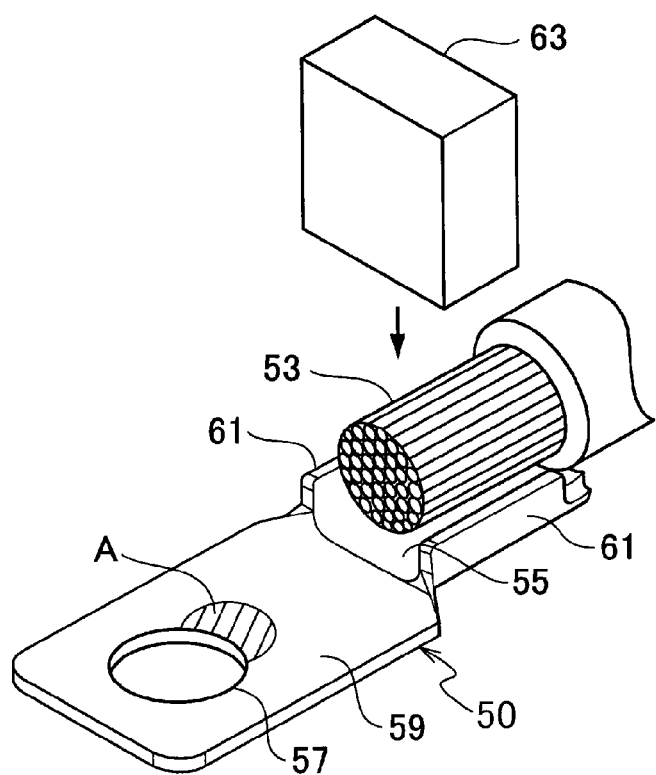
FIG. 6 is an appearance perspective view of a traditional terminal fitting before the terminal fitting is ultrasonically welded.

With reference to FIGS. 4A to 4C, the through hole 21 of the present embodiment is described in contrast to the traditional through hole 57 shown in FIG. 6. FIG. 4A is a top view of the present embodiment. FIG. 4B is a schematic view which illustrates the shape of the through hole 21 of the present embodiment as a change of the cross section area of the mounting part 23 in a direction perpendicular to the central axis X. FIG. 4C is a schematic view which illustrates the shape of the traditional through hole 21 shown in FIG. 6 as a change of the cross section area of the mounting part 23 in a direction perpendicular to the central axis X. In FIGS. 4B and 4C, the vertical width represents the size of the cross section area of the mounting part 23. In FIGS. 4B and 4C, in the axial direction, a change that the vertical width gets smaller means that the cross section area of the mounting part 23 decreases, and a change that the vertical width gets larger means that the cross section area of the mounting part 23 increases. In the following description, change rate of the cross section area means the change ratio of the cross section area of the mounting part 23 along a direction (a direction from right to left in FIG. 4) in which the axial vibration spreads.

First, for the circular through hole 57 shown in FIG. 6, as shown in an enlarged FIG. Z of FIG. 4C, there is an area where the change rate (decrease rate) of the cross section area becomes relatively large. In contrast, for the through hole 21 of the present embodiment, as shown in an enlarged FIG. Y of FIG. 4B, a contour of the small radius circle 33 whose radius of curvature is smaller than that of the large radius circle 31 is formed at a position that is closer to the core wire connecting part 19 than the large radius circle 31. Therefore, the decrease rate of the cross section area of the through hole 21 can be smaller than that of the through hole 57. Because the cross section area of the mounting part 23 decreases along the two tangent lines 35, 37 which respectively connect the large radius circle 31 and the small radius circle 33 in the axial direction, the decrease rate of the cross section area of the through hole 21 can be kept constant.

According to the present embodiment, it can be prevented that the cross section area of the mounting part 23 in the direction perpendicular to the direction in which the vibration spreads in the mounting part 23 suddenly decreases along the direction in which the vibration spreads, when the core wire 13 of the electric wire 11 is ultrasonically welded. Therefore, a crack or a break of the mounting part 23 can be prevented because the concentration of the stress by resonance mainly on the part, near the core wire connecting part 19, of the periphery of the through hole 21, that is, the A' area of FIG. 1, can be alleviated.

Then, a terminal fitting according to another embodiment of the present invention is described with reference to FIGS. 5A and 5B. The constitution of the terminal fitting of the present embodiment is roughly the same as the constitution of the terminal fitting 17 shown in FIG. 1. The constitution of the terminal fitting of the present embodiment is different from the constitution of the terminal fitting 17 of FIG. 1 in that the contour of the through hole is formed by including the large radius circle and two small radius circle.

Figure 5A:
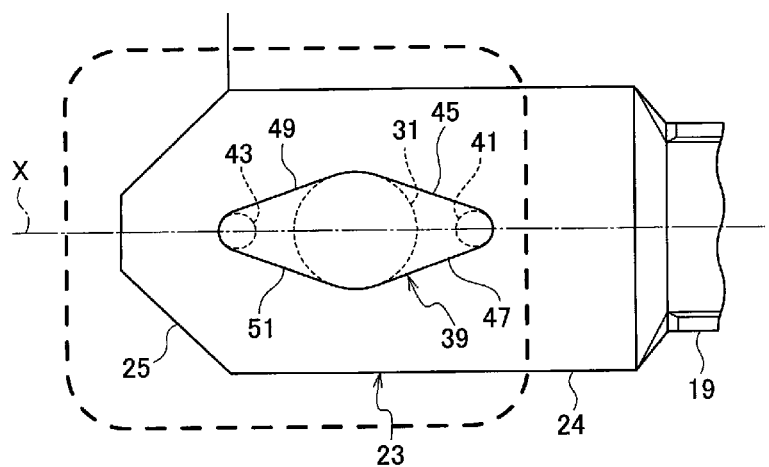
Figure 5B:
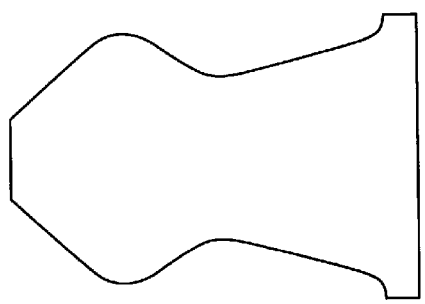

The contour, when viewed from the penetration direction, of a through hole 39 of the present embodiment is formed, as shown in FIG. 5A, by uniting a large radius circle 31, a first small radius circle 41 and a second small radius circle 43, two tangent lines 45, 47 which respectively connect the first small radius circle 41 and the large radius circle 31, and two tangent lines 49, 51 which respectively connect the second small radius circle 43 and the large radius circle 31. Here, the first small radius circle 41 means a circle which has a radius R3 that is smaller than the radius R1 of the large radius circle 31, and the second small radius circle 43 means a circle which has a radius R4 that is smaller than the radius R1 of the large radius circle 31. The radius R3 may be different from the radius R4, or may be the same as the radius R4. The center of the large radius circle 31 and the centers of the first small radius circle 41 and the second small radius circle 43 are all placed on the longitudinal central axis X of the mounting part 23. The first small radius circle 41 is placed to be closer to the core wire connecting part 19 than the large radius circle 31, and the second small radius circle 43 is placed to be farther from the core wire connecting part 19 than the large radius circle 31. At least the part of the large radius circle 31 and the first small radius circle 41 of the through hole 39 is formed in an axial area of the straight part 24 in the mounting part 23.

In this embodiment, not only at the position closer to the core wire connecting part 19 than the large radius circle 31, a contour of the first small radius circle 41 whose radius of curvature is smaller than that of the large radius circle 31 is formed, but also at the position farther from the core wire connecting part 19 than the large radius circle 31, a contour of the second small radius circle 43 whose radius of curvature is smaller than that of the large radius circle 31 is formed. Therefore, as shown in FIG. 5B, the cross section area of the mounting part 23 of the through hole 39 in the axial direction can be prevented from suddenly decreasing and increasing in comparison with the through hole 57 (the large radius circle 31). Thereby, a crack or a break of the mounting part 23 can be prevented in a wider range because the concentration of the stress by resonance on the part, near the distal end of the mounting part 23, of the periphery of the through hole 39, besides the part, near the core wire connecting part 19, of the periphery of the through hole 39, can be alleviated.

The present invention is not limited to the above-described embodiments, and suitable modifications, improvements and the like can be made. Moreover, the materials, shapes, dimensions, numbers, installation places, and the like of the components in the above embodiment are arbitrarily set as far as the invention can be attained, and not particularly restricted.

Although the invention is described in detail with reference to the specific embodiments, it is apparent that various modifications and amendments may be made by those skilled in the art without departing from the spirit and scope of the invention.

This application is based on the Japanese patent application (patent application No. 2012-202924) filed on Sep. 14, 2012, whose content is incorporated herein by reference.

INDUSTRIAL APPLICABILITY

According to the present invention, a crack or a break of the mounting part can be prevented when the conductor part of an electric wire is ultrasonically welded to a terminal fitting.

The present invention that achieves such an effect is useful in the field of terminal fittings.

The features of the terminal fittings according to the embodiments of the present invention described above are briefly, collectively listed in the following [1] to [2], respectively.

[1] A terminal fitting (17) to which the conductor part of an electric wire (11), which is formed by insulatively coating a plurality of core wires (13), is electrically connected by being ultrasonically welded, wherein
the terminal fitting (17) comprises a welded part (26) to which the conductor part of the electric wire (1) is ultrasonically welded, and a board-like mounting part (23) which is formed integrally with the welded part (26) in an axial direction and which a through hole (21) penetrates in a thickness direction, and
a contour, when viewed from the penetration direction, of the through hole (21) is formed of a large radius circle (31), a small radius circle (33) whose radius is smaller than that of the large radius circle (31), and two tangent lines (35, 37) which respectively connect the two circles (31, 33), and the small radius circle (33) is located closer to the welded part (26) than the large radius circle (31).

[2] A terminal fitting (17) to which the conductor part of an electric wire (11), which is formed by insulatively coating a plurality of core wires (13), is electrically connected by being ultrasonically welded, wherein the terminal fitting (17) comprises a welded part (26) to which the conductor part of the electric wire (11) is ultrasonically welded, and a board-like mounting part (23) which is formed integrally with the welded part (26) in an axial direction and which a through hole (39) penetrates in a thickness direction, and the mounting part (23) has a straight part (24) whose two side surfaces in a widthwise direction perpendicular to the axial direction are formed parallel to each other, a contour, when viewed from the penetration direction, of the through hole (39) is formed of a large radius circle (31), a first small radius circle (41) and a second small radius circle (43) whose radiuses are smaller than that of the large radius circle (31), two tangent lines (45, 47) which respectively connect the first small radius circle (41) and the large radius circle (31), and two tangent lines (49, 51) which respectively connect the second small radius circle (43) and the large radius circle (31), the first small radius circle (41) is located closer to the welded part (26) than the large radius circle (31), the second small radius circle (43) is located farther from the welded part (26) than the large radius circle (31), and the large diameter circle and the first small radius circle are formed in an area of the straight part in the axial direction.

DESCRIPTION OF THE NUMBERS 11 electric wire
13 core wire
17 terminal fitting
19 core wire connecting part
21, 39 through hole
23 mounting part
24 straight part
26 welded part
29 horn
31 large radius circle
33 small radius circle
35, 37, 45, 47, 49, 51 tangent line
41 first small radius circle
43 second small radius circle

The invention claimed is:

1. A terminal fitting to which a conductor part of an electric wire, which is formed by insulatively coating a plurality of core wires, is electrically connected by being ultrasonically welded, wherein:

the terminal fitting comprises:
a welded part to which the conductor part of the electric wire is ultrasonically welded; and
a board-like mounting part which is formed integrally with the welded part in an axial direction and through which a through hole penetrates in a thickness direction,
a contour, when viewed from the penetration direction, of the through hole is formed of a large radius circle, a small radius circle whose radius is smaller than that of the large radius circle, and two tangent lines, which respectively connect and are tangent to the large radius circle and the small radius circle, the two tangent lines forming edges of the through hole and
the small radius circle is located closer to the welded part than the large radius circle.

2. A terminal fitting to which a conductor part of an electric wire, which is formed by insulatively coating a plurality of core wires, is electrically connected by being ultrasonically welded, wherein:

the terminal fitting comprises:
a welded part to which the conductor part of the electric wire is ultrasonically welded; and
a board-like mounting part which is formed integrally with the welded part in an axial direction and through which a through hole penetrates in a thickness direction;
the mounting part has a straight part, the straight part having two side surfaces in a widthwise direction perpendicular to the axial direction, the two side surfaces being formed parallel to each other,
a contour, when viewed from the penetration direction, of the through hole is formed of a large radius circle, a first small radius circle and a second small radius circle whose radiuses are smaller than that of the large radius circle, a first two tangent lines, which respectively connect the first small radius circle and the large radius circle, and a second two tangent lines which respectively connect the second small radius circle and the large radius circle, the first small radius circle being located closer to the welded part than the large radius circle, the second small radius circle being located farther from the welded part than the large radius circle, and
the large radius circle and the first small radius circle are formed in an area of the straight part in the axial direction.

* * * * *